J. C. MILLIGAN.
Milk-Cans.
No. 5,851. Reissued April 28, 1874.
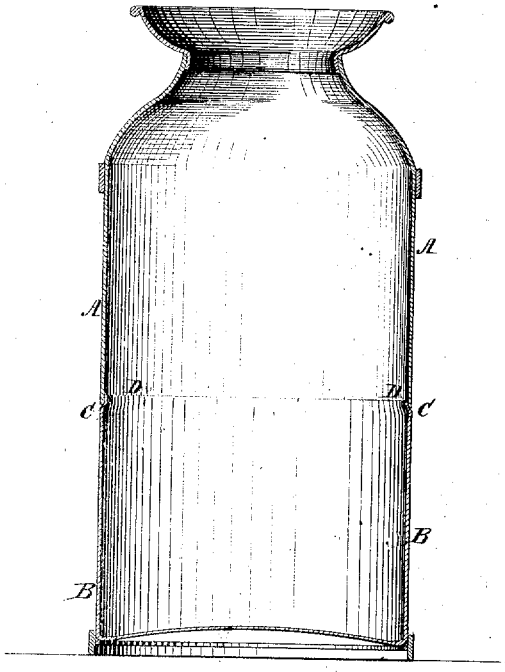
Witnesses:
G. Mathys
Solon Kemon
Inventor:
Jno. C. Milligan
Per Munn & Co.
Attorneys.

UNITED STATES PATENT OFFICE.

JOHN C. MILLIGAN, OF BROOKLYN, NEW YORK.

IMPROVEMENT IN MILK-CANS.

Specification forming part of Letters Patent No. 107,[illegible]1, dated September 20, 1870; reissue No. 5,851, dated April 28, 1874; application filed February 10, 1874.

DIVISION B.

*To all whom it may concern:*

Be it known that I, JOHN C. MILLIGAN, of Brooklyn, in the county of Kings and State of New York, have invented a new and useful Improvement in Milk-Cans; and I do hereby declare that the following is a full, clear, and exact description of the same, reference being had to the accompanying drawing, forming a part of this specification.

The invention relates to a novel mode of constructing milk-cans, so that they can be more conveniently and thoroughly cleaned, thus, not only saving labor, but preventing a subsequent supply of milk from being deteriorated by the spoiled portions of the former contents which have adhered to the joints of the can.

The drawing is a vertical sectional elevation of my improved milk-can.

A represents the upper section of can, comprising the neck, breast, and preferably about one-half of the cylinder; and B, the lower section, embracing the bottom and a moiety of the cylinder. C is an outward corrugation or ring-stop upon the upper edge of section B; while D is a flange on the lower edge of section A, set out to encircle and fit down over the edge of B as far as the corrugation.

This gives me but one single joint in the whole can, and that one preferably at the middle, where it can be reached by hand with great facility, and from whence every vestige of the milk that has adhered to the can from its former contents can be eradicated without particular pains or attention. Of course the same idea would be embodied, whether the joint were exactly at the middle or at some approximate point, the invention consisting essentially of a two-part can, horizontally and singly jointed, so as to bring the joint within easy reach of the hand.

The particular joint which I form is a preferable one; but in no way concerns the principle of my present invention.

The two sections may be struck up or shaped by stamps and dies, or brought into the forms described in any suitable manner.

Having thus described my invention, what I claim as new is—

As an article of manufacture, a milk-can made in two parts, and having said parts jointed together on a horizontal plane, passing therethrough at or near the middle of body, as and for the purpose specified.

JOHN C. MILLIGAN.

Witnesses:

A. P. THAYER,

CHARLES H. NASH.